(12) United States Patent
Ishikawa et al.

(10) Patent No.: US 6,206,801 B1
(45) Date of Patent: Mar. 27, 2001

(54) CONTINUOUSLY VARIABLE TRANSMISSION

(75) Inventors: Koji Ishikawa; Hiroyuki Ito; Hisashi Machida; Nobuo Goto, all of Fujisawa; Makoto Fujinami, Chiba; Hiroshi Kato, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/127,736

(22) Filed: Aug. 3, 1998

(30) Foreign Application Priority Data

Aug. 4, 1997 (JP) .................................................. 9-209065
Nov. 21, 1997 (JP) .................................................. 9-321675

(51) Int. Cl.$^7$ .................................................. F16H 15/38
(52) U.S. Cl. .................................................. 476/46; 476/42
(58) Field of Search .................................. 476/8, 10, 40, 476/41, 42, 46

(56) References Cited

U.S. PATENT DOCUMENTS

| 4,893,517 | | 1/1990 | Nakano | 74/200 |
|---|---|---|---|---|
| 5,027,669 | * | 7/1991 | Nakano | 476/41 |
| 5,067,360 | * | 11/1991 | Nakano | 476/10 |
| 5,267,920 | * | 12/1993 | Hibi | 476/46 X |
| 5,299,988 | * | 4/1994 | Fukushima et al. | 476/42 |
| 5,888,167 | * | 3/1999 | Yamamoto | 476/8 |
| 5,899,827 | * | 5/1999 | Nakano et al. | 476/8 X |
| 5,902,208 | * | 5/1999 | Nakano | 476/42 |

FOREIGN PATENT DOCUMENTS

| 42 14 977 | * | 5/1991 | (DE) . |
|---|---|---|---|
| 0 780 599 | * | 6/1997 | (EP) . |
| 1-173552 | | 12/1989 | (JP) . |
| 4-351361 | | 12/1992 | (JP) . |
| 6-280957 | | 10/1994 | (JP) . |
| 8-17074 | * | 7/1996 | (JP) . |

* cited by examiner

Primary Examiner—David Fenstermacher
(74) Attorney, Agent, or Firm—Vorys, Sater, Seymour and Pease LLP

(57) ABSTRACT

A continuously variable transmission provided with a rotary shaft characterized in that a ball spline is formed between an inner peripheral surface of a first disc and an outer peripheral surface of an intermediate portion of a rotary shaft, a restraining members for limiting displacement of balls of a ball spline is provided on an inner side of the inner peripheral surface of the first disc, a small-diametered portion is formed on the outer peripheral surface of the intermediate portion of the rotary shaft and between the first disc and a second disc, and the restraining members is mountable through the small-diametered portion with the restraining members and the small-diametered portion axially aligned with each other.

16 Claims, 10 Drawing Sheets

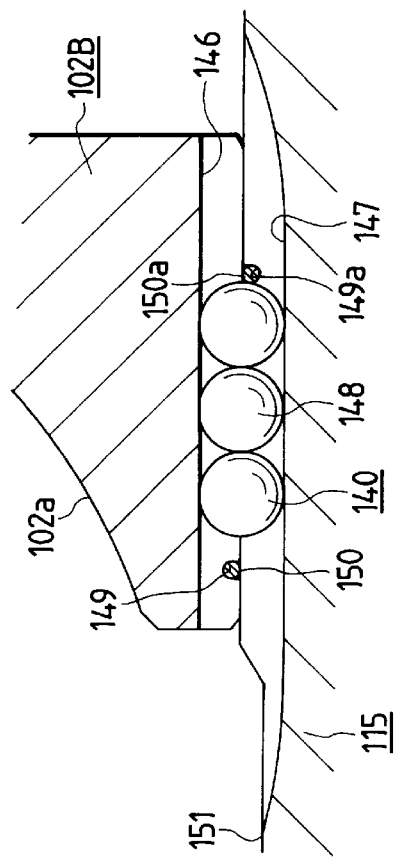
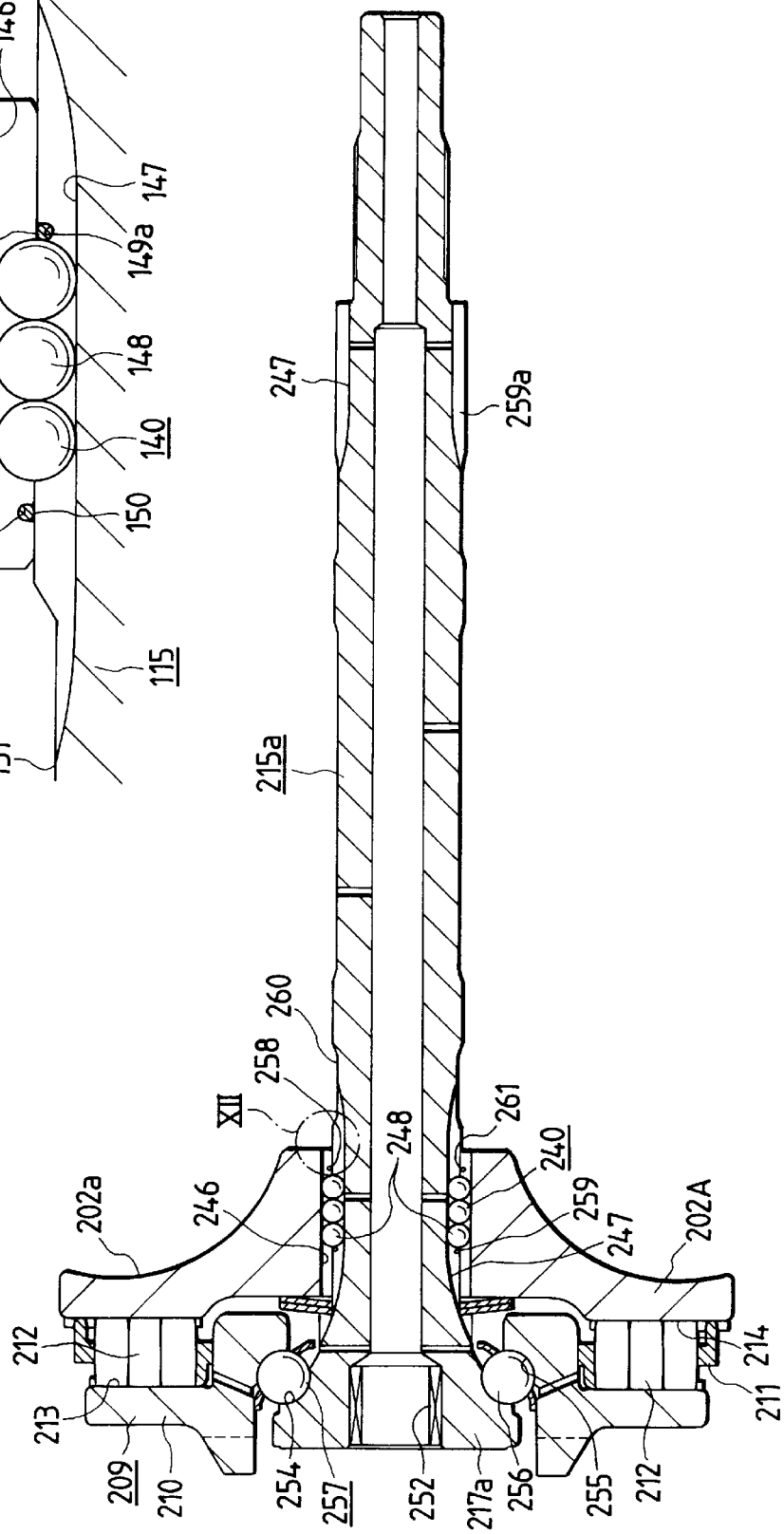

CONTINUOUSLY VARIABLE TRANSMISSION

BACKGROUND OF THE INVENTION

1. Field of the Invention

This invention relates to a continuously variable transmission which can continuously change the transmission ratio between an input shaft and an output shaft, in various industrial machines including automobiles.

2. Related Background Art

Various types of continuously variable transmissions are used and one of them is a toroidal type continuously variable transmission. This is a transmission in which the opposed surfaces of an input disc mounted on an input shaft and an output disc mounted on an output shaft are formed by toroidal surfaces. A power roller is disposed between these toroidal surfaces, and by changing the rocked state (angle) thereof, the transmission gear ratio between the input shaft and the output shaft can be changed.

FIGS. 1 and 2 of the accompanying drawings show a conventional toroidal type continuously variable transmission described in Japanese Utility Model Laid-Open Application No. 1-173552. An input side disc 2 and an output side disc 4 are rotatably supported around a tubular input shaft 15 through needle bearings 16. Also, a cam plate 10 is spline-engaged with the outer peripheral surface of an end portion (the left end portion as viewed in FIG. 1) of the input shaft 15 and is prevented from moving away from the input side disc 2 by a flange portion 17. This cam plate 10 and rollers 12 together constitute a pressing device 9 of the loading cam type for rotating the input side disc 2, on the basis of the rotation of the input shaft 15 while pressing the input side disc 2 toward the output side disc 4. An output gear 18 is coupled to the output side disc 4 through a key 19 so that the output side disc 4 and the output gear 18 may be rotated synchronously with each other. The output gear 18 is rotatably supported by a bearing 41.

The opposite end portions of a pair of trunnions 6 are supported by a pair of supporting plates 20 for rocking about an axis X—X and for displacement in X—X direction (the front to back direction as viewed in FIG. 1 or the left to right direction as viewed in FIG. 2). Displacement shafts 7 are rotatably supported in circular holes 23 formed in the intermediate portions of the trunnions 6 through needle bearings 24. Also, power rollers 8 are rotatably supported around pivot shaft portions 22 through needle bearings 25.

The pair of displacement shafts 7 are provided at opposite side positions relative to the input shaft 15, and the pivot shaft portions 22 are eccentric relative to support shaft portions 21. The direction of eccentricity is the same direction (the right to left direction as viewed in FIG. 2) in the rotational direction of the input side and output side discs 2 and 4 and a direction substantially orthogonal to the lengthwise direction of the input shaft 15. Accordingly, the power rollers 8 are somewhat displaceable in the lengthwise direction of the input shaft 15.

Thrust ball bearings 26 and thrust needle bearings 27 are provided between the outer side of the power rollers 8 and the inner side of the intermediate portions of the trunnions 6. The thrust ball bearings 26 support a load in a thrust direction applied to the power rollers 8, and yet permit the rotation thereof. The thrust needle bearings 27 support a thrust load applied from the power rollers 8 to outer races 30, and yet permit the pivot shaft portions 22 and the outer races 30 to rock about the support shaft portions 21.

Driving pistons 37 are secured to the outer peripheral surfaces of the intermediate portions of driving rods 36 coupled to one end portion (the left end portion as viewed in FIG. 2) of the trunnions 6, and are fitted in an oil-tight manner in driving cylinders 38. Consequently, the rotation of the input shaft 15 is transmitted to the input side disc 2 through the pressing device 9, and the rotation of this input side disc 2 is transmitted to the output side disc 4 through the pair of power rollers 8, and further the rotation of this output side disc 4 is output via the output gear 18.

When the rotational speed ratio between the input shaft 15 and the output gear 18 is to be changed, the pair of driving pistons 37 are displaced in opposite directions. With this, the pair of trunnions 6 are displaced in opposite directions (for example, the lower power roller 8 in FIG. 2 to the right and the upper power roller 8 to the left). As the result, the direction of a force in the tangential direction acting on the portions of contact between the peripheral surfaces 8a of these power rollers 8 and the inner sides 2a and 4a of the input side disc 2 and the output side disc 4 changes. With this change, the trunnions 6 rock in opposite directions about a pivot shaft X—X pivotally supported by the supporting plates 20.

When the transmission of the rotational force is thus effected between the input shaft 15 and the output gear 18, the power rollers 8 are displaced axially of the input shaft 15 on the basis of the resilient deformation of each constituent member, and the displacement shafts 7 are slightly pivotally moved about the support shaft portions 21. As the result, the outer sides of the outer races of the thrust ball bearings 26 and the inner sides of the trunnions 6 are displaced relative to each other.

Further, there is known a structure (double cavity type) in which to increase transmittable torque, as shown in FIG. 3 of the accompanying drawings, input side discs 52A, 52B and output side discs 54A, 54B are disposed at the opposite ends of an input shaft 65 to be parallel to one another with respect to the direction of transmission of power. These output side discs 54A, 54B are mounted around the input shaft 65 through bearings 66 to thereby make the rotation thereof relative to the input shaft 65 and the displacement thereof in the axial direction of the input shaft 65 possible. The input side discs 52A, 52B are supported for axial movement relative to the input shaft 65 and for rotation in a circumferential direction with the input shaft. An output gear 68a is rotatably supported on the intermediate portion of the input shaft 65, and the output side discs 54A, 54B are spline-engaged with the opposite end portions of a cylindrical portion provided in the central portion of the output gear 68a.

One (the left as viewed in FIG. 3) input side disc 52A has its back abutted against a loading nut 89 through a belleville spring 95 having a great resilient force (in some case, abutted directly against the loading nut) to thereby substantially prevent the axial displacement thereof relative to the input shaft 65. In contrast, the input side disc 52B opposed to a cam plate 60 is supported on the input shaft 65 by a ball spline 90A for axial displacement, and a belleville spring 91 and a thrust needle bearing 92 are provided in series between the back (the right surface as viewed in FIG. 3) of the input side disc 52B and the front surface (the left surface as viewed in FIG. 3) of the cam plate 60. The belleville spring 91 serves to impart a pre-load to the portions of contact between the inner sides 52a, 54a of the discs 52A, 52B; 54A, 54B and the peripheral surfaces 58a of power rollers 58, and the thrust needle bearing 92 serves to permit the relative rotation of the input side disc 52B and the cam plate 60 during the operation of a pressing device 59.

As shown in FIG. 3, in a toroidal type continuously variable transmission of the so-called double cavity type, one or both of the input side discs 52A, 52B opposed to the cam plate 60 are supported for axial displacement relative to the input shaft 55 by ball splines 90A, 90B. The purposes of this are:

(i) To completely synchronize the rotations of the input side discs 52A, 52B with each other; and (ii) To endow the function of item (i) above, and yet permit the input side discs 52A, 52B to be axially displaced relative to the input shaft 65 on the basis of the resilient deformation of each constituent member resulting from the operation of the pressing device 59.

The ball splines 90A, 90B are provided with inner diameter side ball spline grooves 96 formed in the inner peripheral surfaces of the input side discs 52A, 52B, the same number of outer diameter side ball spline grooves 97 as the spline grooves 96 formed in the outer peripheral surface of the intermediate portion of the input shaft 65, and a plurality of balls 98 provided for rolling between the two. As regards the ball spline 90A for supporting the input side disc 52B, a restraining ring 88A is restrained in a restraining groove 99A formed in the portion toward the inner side 52a of the inner peripheral surface of the input side disc 52B to thereby prevent the plurality of balls 98 from being displaced toward the inner sides 52a of the input side discs 52A, 52B and slipping out from between the inner diameter side and outer diameter side ball spline grooves 96 and 97. As regards the ball spline 90B for supporting the input side disc 52A, a restraining ring 88B is restrained in a restraining groove 99B formed in the outer peripheral surface of the intermediate portion of the input shaft 65 to thereby limit the plurality of balls 98 being displaced toward the inner side 52a of the input side disc 52A.

Also, when in a toroidal type continuous variable transmission incorporating a loading cam device therein, input torque is small and a torque difference is created between a cam disc and an input disc, the urging force of the input disc toward a power roller may sometimes be deficient and the power roller may idly rotate. Therefore, a pre-load force generating device such as a belleville spring is provided between the cam disc and the input disc to thereby make up for a pressing force toward a torque input shaft (see the belleville springs 91 and 95 of FIG. 3).

The pressing force of the input disc toward the torque input shaft by the above-mentioned pre-load generating device is minimum in a state in which during stoppage or during steady rotation or the like, little or no torque difference is created between the cam disc and the input disc, and is designed to continuously increase in conformity with a torque difference created between the two discs. Accordingly, when the loading cam device is to be incorporated into the toroidal type continuously variable transmission, it is necessary to correctly dispose rolling members in the recesses of the two cam surfaces of the cam disc and the input disc. In order to accomplish this incorporating work easily, it is known to provide the loading cam device with a tentative assembling mechanism capable of integrally fixing the recesses of the two cam surfaces of the cam disc and the input disc in advance in a state in which their positional relation is uniformized so that they may correspond to the rolling members held by a holder.

As the tentative assembling mechanism of this kind, one using a knock pin and one using a threaded hole and a bolt are disclosed in Japanese Patent Laid-Open Application No. 4-351361. When the knock pin is used, the knock pin is inserted into a pin hole extending through the cam disc, the holder and the input disc, and the cam disc, the holder and the input disc are fixed integrally with the pre-load generating device by a frictional force between the knock pin and each pin hole. Also, when the threaded hole and the bolt are used, through-holes are formed in the cam disc and the holder and a threaded hole is formed in the input disc, and the bolt is screwed into the threaded hole of the input disc through the through-hole to thereby fix the cam disc, the holder and the input disc integrally with the pre-load generating device.

If this is done, the rolling members can be prevented from escaping the recesses of the two cam surfaces of the cam disc and the input disc, so that the loading cam device can be reliably incorporated into the toroidal type continuously variable transmission in a state in which the generated pressing force is minimum.

In the case of the above-described conventional structure of FIGS. 1 to 3, however, the work of restraining the restraining ring 88A in the restraining groove 99A formed in the inner peripheral surface of the input side disc 52B on the pressing device 59 side has been cumbersome, and this has contributed to high cost of the toroidal type continuously variable transmission. That is, after the input side disc 52B is fitted around the intermediate portion of the input shaft 65, a gap large enough to pass the restraining ring 88A therethrough does not exist between the inner peripheral surface of the input disc 52B and the outer peripheral surface of the input shaft 65. Therefore, it is necessary to mount the restraining ring 88A in the restraining groove 99A prior to fitting the input side disc 52B around the input shaft 65. The plurality of balls 98 are lightly secured to the outer diameter side ball spline groove 97 in advance by grease or the like, and in that state, the input side disc 52B is fitted around the ball spline groove 97.

The, the lubrication of the internal mechanism of the toroidal type continuously variable transmission including the ball spline 90A is done by traction oil, so that it would be unnecessary to apply grease to the outer diameter side ball spline groove 97 but for the work of lightly securing the plurality of balls 98 by the grease or the like to assemble the input side disc 52B to the input shaft 65 with the restraining ring 88A mounted in the restraining groove 99A.

When, the above-described toroidal type continuously variable transmission is to be assembled, various constituents (such as the input shaft and the input and output discs) have heretofore been successively assembled inside a housing 40 (FIG. 2) for containing the body of the transmission. Accordingly, the deviation of the positional relation of each portion based on the integration of the dimensional error of each constituent and whether each constituent will properly function after assembly could be confirmed only after these constituents have been actually assembled in the housing 40.

In addition, to secure the operational efficiency and durability of the continuously variable transmission, the positional relations among the constituents must of course be maintained highly accurate. Therefore, when the deviation of the positional relation of each portion becomes great beyond a predetermined limit due to the integration of the dimensional error of each constituent, the continuously variable transmission assembled in the housing 40 is disassembled to make this deviation small by the combination with other parts, whereafter reassembly must be done. However, this makes the manufacture of the continuously variable transmission cumbersome and cannot achieve a reduction in cost.

Also, in the toroidal type continuously variable transmission provided with the above-described tentative assembling mechanism, the positions of the pin hole, the through-hole and the threaded hole formed in the cam disc, the rolling member and the input disc must be made accurately coincident with one another during the formation of the parts. Therefore, strictness is required of the working of these three parts, and unless this requirement is satisfied, bad working becomes apt to occur. Also, the threaded hole must be formed in the input disc, and this has led to the possibility that damage due to fracture may occur.

Further, in the loading cam device using the knock pin, the magnitude of the frictional force between the knock pin and each pin hole is often not sufficient to compress the pre-load force generating device. Sometimes the integral fixing of the cam disc, the rolling member and the input disc has become unreliable and this has given rise to a hindrance to the incorporating work. Also, in the loading cam device using the threaded hole and the bolt, the deficiency of the compressive force can be prevented, but a force is required of the fastening of a screw and for this reason, the assembling process for the toroidal type continuously variable transmission cannot be simplified.

SUMMARY OF THE INVENTION

The present invention has been conceived in view of the aforementioned problems of conventional continuously variable transmissions.

Thus, according to one of its aspects, the invention provides a continuously variable transmission designed to facilitate the assembly of a ball spline.

According to another of its aspects, the invention provides a continuously variable transmission in which an. input disc is incorporated in a unit to facilitate the assembly of components into the housing.

According to still another of its aspects, the invention provides a continuously variable transmission in which bad working of an input disc working of an input disc and the occurrence of a fracture can be prevented during the working of parts, but the simplification of an assembling process can be achieved.

In that case, it has been taken into consideration that inconvenience has occurred because in the conventional loading cam device, the cam disc and the input disc are fixed with a holder held therebetween, and therefore the compressed state of the pre-load force generating device provided between the cam disc and the output disc must be maintained. The foregoing and other aspects of the invention will be more fully appreciated from the description of the preferred embodiments hereinafter in conjunction with the accompanying drawings.

BRIEF DESCRIPTION OF THE DRAWINGS

FIG. 10 is a cross-sectional view showing a state subsequent to the state of FIG. 9.

FIG. 11 is a cross-sectional view of principal portions showing a second embodiment of the present invention in a state in which an input shaft and an input side disc have been combined together through a ball spline.

DESCRIPTION OF THE PREFERRED EMBODIMENTS

Figure 1:
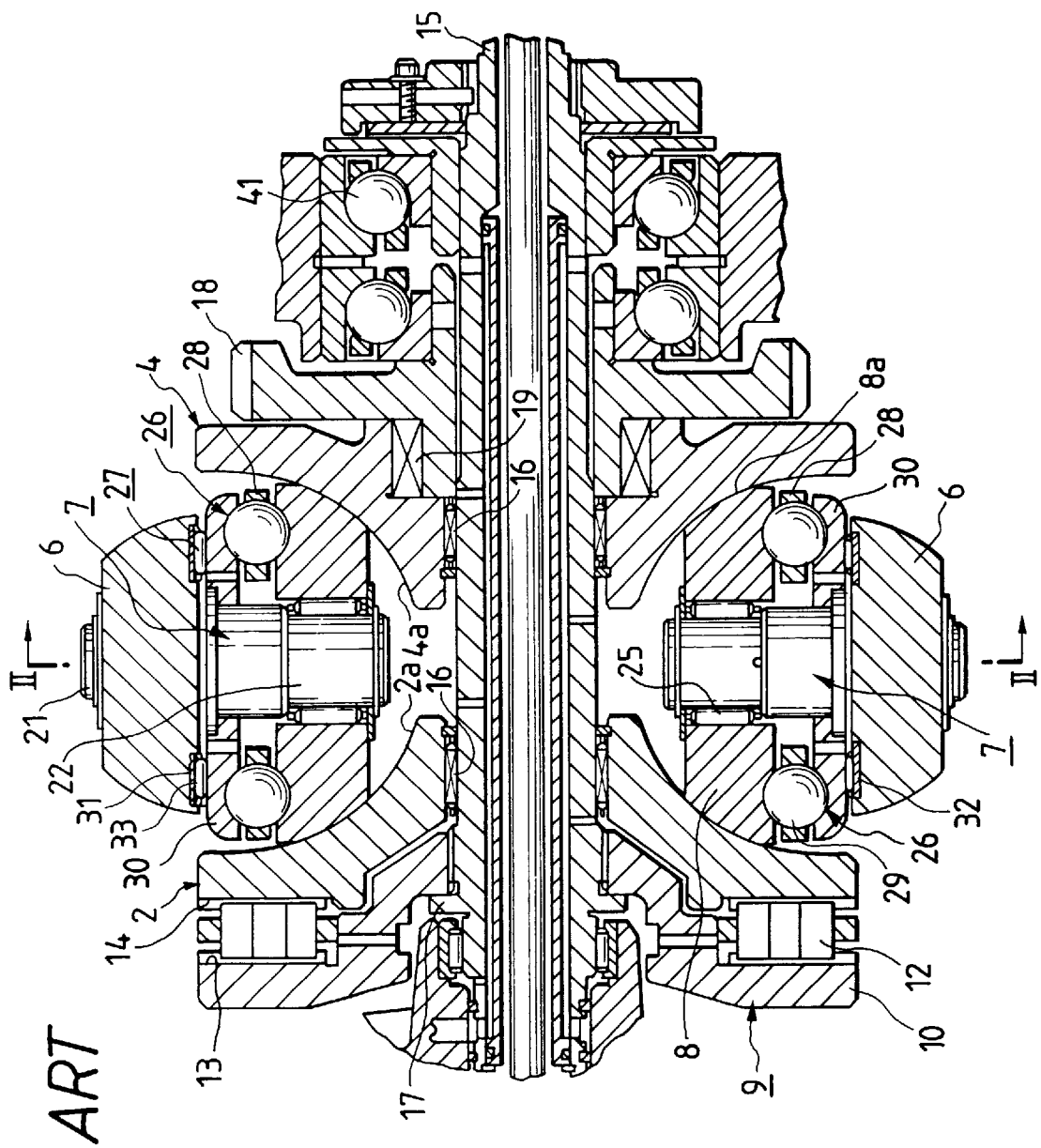
FIG. 1 is a cross-sectional view showing a first example of a specific structure according to the prior art.

Some embodiments of the present invention will hereinafter be described with reference to the drawings.

FIGS. 4 to 10 show first and second embodiments of the present invention. A principal feature of these embodiments resides in structure for enabling the work of mounting an input side disc 102B around an input shaft 115 through a ball spline 140 to be done easily, and therefore chiefly this characteristic portion of the present invention will hereinafter be described. The structure and action of the other portions are similar to those of the aforedescribed conventional structure and therefore need not be shown and described or will be simply described.

On the outer peripheral surface of the axially intermediate portion of the input shaft 115 and the portion between the input side disc 102B and an output side disc 104B, a small-diametered portion 151 smaller in outer diameter than the other portion 151a is formed over the entire periphery thereof. A plurality of outer diameter side ball spline grooves 147 are axially formed in the small-diametered portion 151 over a predetermined length. An annular restraining groove 150B is formed in that portion toward the right end of the small-diametered portion 151 in which the spline grooves 147 are formed.

On the other hand, a plurality of inner diameter side ball spline grooves 146 opposed to the spline grooves 147 of the input shaft 115 are axially formed over a predetermined length in the portion of the inner peripheral surface of the input side disc 102B and toward the inner side 102a thereof (toward the left end as viewed in FIGS. 4 to 10), and a restraining groove 149A is formed perpendicularly across the spline grooves 146 over the entire periphery. A restraining ring 150A is mounted in the restraining groove 149A through the small-diametered portion 151 with the inner diameter side opening portion of the restraining groove 149A and the small-diametered portion aligned with each other in advance. The level difference h (see FIG. 5) between the outer peripheral surface of the small-diametered portion 151 and a portion (large-diametered portion) 151a off the small-diametered portion 151 is made greater than the diametral length $W_{50}$ of the restraining ring 150A ($h > W_{50}$). The restraining ring 150A is formed into a C-shape by a resilient material such as stainless spring steel or synthetic resin having an oil-resisting property and a heat-resisting property, and imparts a resilient force in a direction to widen its diameter in a free state. In contrast, the right restraining ring 150B, as will be described below, is mounted in a restraining groove 149B after the input side disc 102B is fitted to the input shaft 115.

Here, the inner diameter side opening portion of the restraining groove 149A and the small-diametered portion 151 are designed to be axially aligned with each other in the state before the rolling surfaces of a plurality of rollers 112 of a pressing device 109 are made to bear against a cam surface 113 formed on one surface (the left surface as viewed in FIGS. 4, 6 and 8) of a cam plate 110 and the protruding portion of a cam surface 114 formed on the outer side of the input side disc 102B (a state in which the amount of axial movement of the input side disc 102B is less than the amount of cam lift by the pressing device 109). For enabling the work of moving the input side disc 102B axially of the input shaft 115 in order to mount the restraining ring 150A in the left restraining groove 149A to be done with a light force by rotating the cam plate 110 constituting the pressing device 109 that, as described above, the relation between the heights of the protruding portions of the two cam surfaces 113, 114 and the positions of formation of the restraining groove 149A and the small-diametered portion 151 is regulated.

Also, a C-shaped restraining ring 150B is mounted in an annular restraining groove 149B formed in the outer peripheral surface of the intermediate portion of the input shaft 115 and that end portion of the outer diameter side ball spline groove 147 which is opposite to the small-diametered portion 151. This restraining ring 150B has a resilient force in a direction to shrink its outer diameter in a free state, and is mounted in the restraining groove 149B to prevent the plurality of balls 148 from slipping out toward the outer side of the input side disc 102B.

With the construction as described above, the work of inserting the plurality of balls 148 of the ball spline 140 between the inner diameter side and outer diameter side ball spline grooves 146 and 147, and the work of mounting the restraining ring 150A on the inner peripheral surface of the input side disc 102B, can be done after the input side disc 102B is fitted on the input shaft 115.

That is, the restraining ring 150B is mounted in advance in the restraining groove 149B formed in the outer peripheral surface of the intermediate portion of the input shaft 115 (in this state, the outer peripheral edge of this restraining ring 150B does not protrude from the outer peripheral surface of the input shaft 115). So, each constituent member of the pressing device 109 and the input side disc 102B are fitted on the input shaft 115 (in this case, the restraining ring 150A is not yet mounted on the input side disc 102B). The input side disc 102B is then fitted on the input shaft 115, and with the inner diameter side and outer diameter side ball spline grooves 146 and 147 aligned with each other in the circumferential direction thereof, the plurality of balls 148 are inserted into these two grooves.

Figure 6:
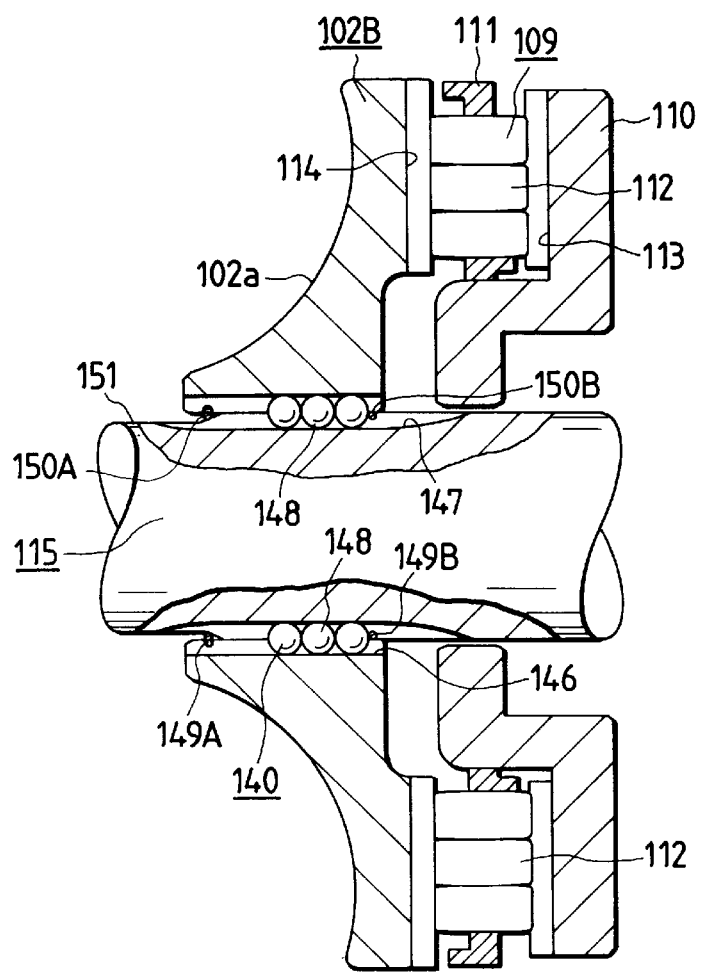
FIG. 6 is a cross-sectional view of principal portions showing a first embodiment in a state in which the input shaft and the input side disc are being combined together through the ball spline.
Figure 7:
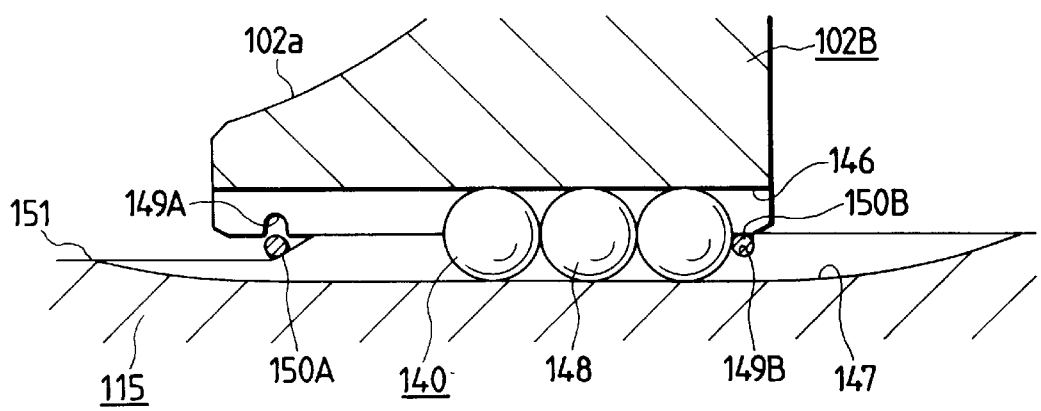
FIG. 7 is an enlarged cross-sectional view of the central upper portion of FIG. 6.
Figure 8:
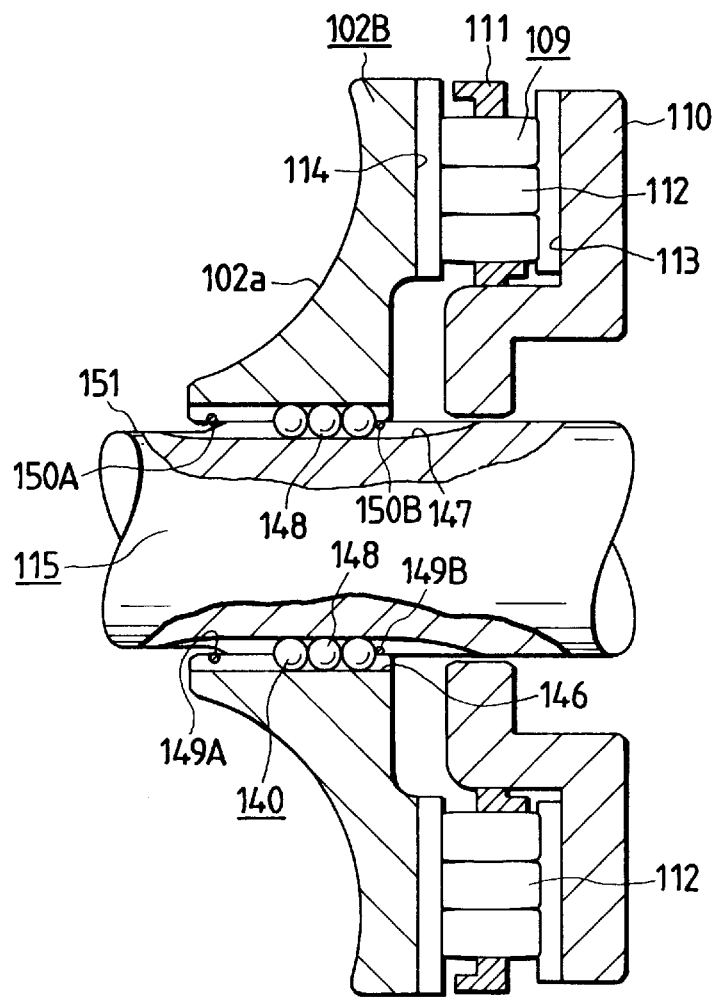
FIG. 8 is a cross-sectional view of principal portions showing a state subsequent to the state of FIG. 6.
Figure 9:
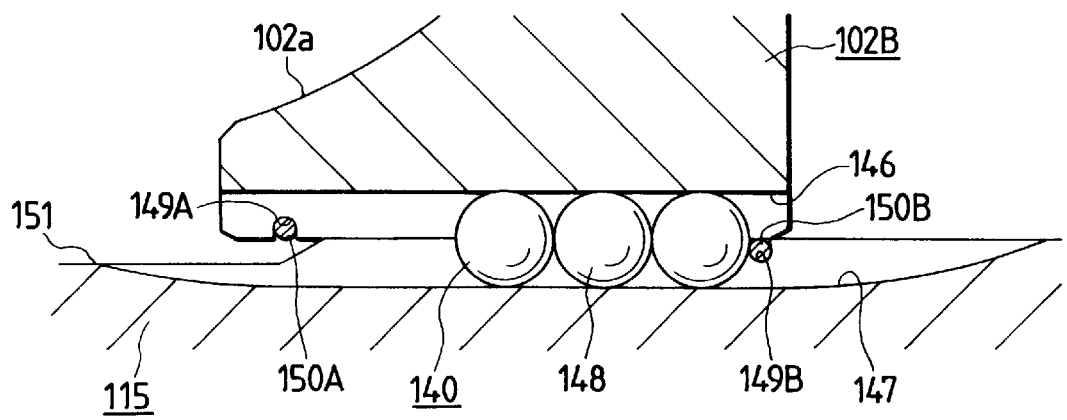
FIG. 9 is an enlarged cross-sectional view of the central upper portion of FIG. 8.

Then, as shown in FIGS. 6 and 7, the cam plate 110 of the pressing device 109 is rotated to thereby move the input side disc 102B axially of the input shaft 115 and open the inner diameter side opening of the restraining groove 149A to the small-diametered portion 151. Through this small-diametered portion 151, the restraining ring 150A is fitted on that portion of the input side disc 102B which is toward the inner side 102a of the inner peripheral surface thereof to thereby axially align it with the restraining groove 149A. By the resiliency of this restraining ring 150A, as shown in FIGS. 8 and 9, this restraining ring 150A is engaged with the restraining groove 149A. At this time, the balls 148 which have borne against the restraining ring 150B are prevented from coming off the outer side of the input side disc 102B during the mounting of the restraining ring 150A, so that the balls are not exposed from the outer side of the input side disc 102B or if exposed, are exposed only by less than the half of the diameter thereof.

When the restraining ring 150A is mounted in the restraining groove 149A in the manner described above, the cam plate 110 is rotated in the opposite direction (or further in the same direction) to thereby cause the rollers 112 to bear against the recesses in the two cam surfaces 113 and 114. As the result, the restraining groove 149A axially deviates from the small-diametered portion 151 and becomes opposed to the large-diametered portion 151a so that, the restraining ring 150A cannot slip out of this restraining groove 149A (FIG. 10). Thus, the work of adhesively securing the plurality of balls 148 to the outer diameter side ball spline groove 147 as in the prior art becomes unnecessary and correspondingly, the assembling work becomes easy.

Figure 2:
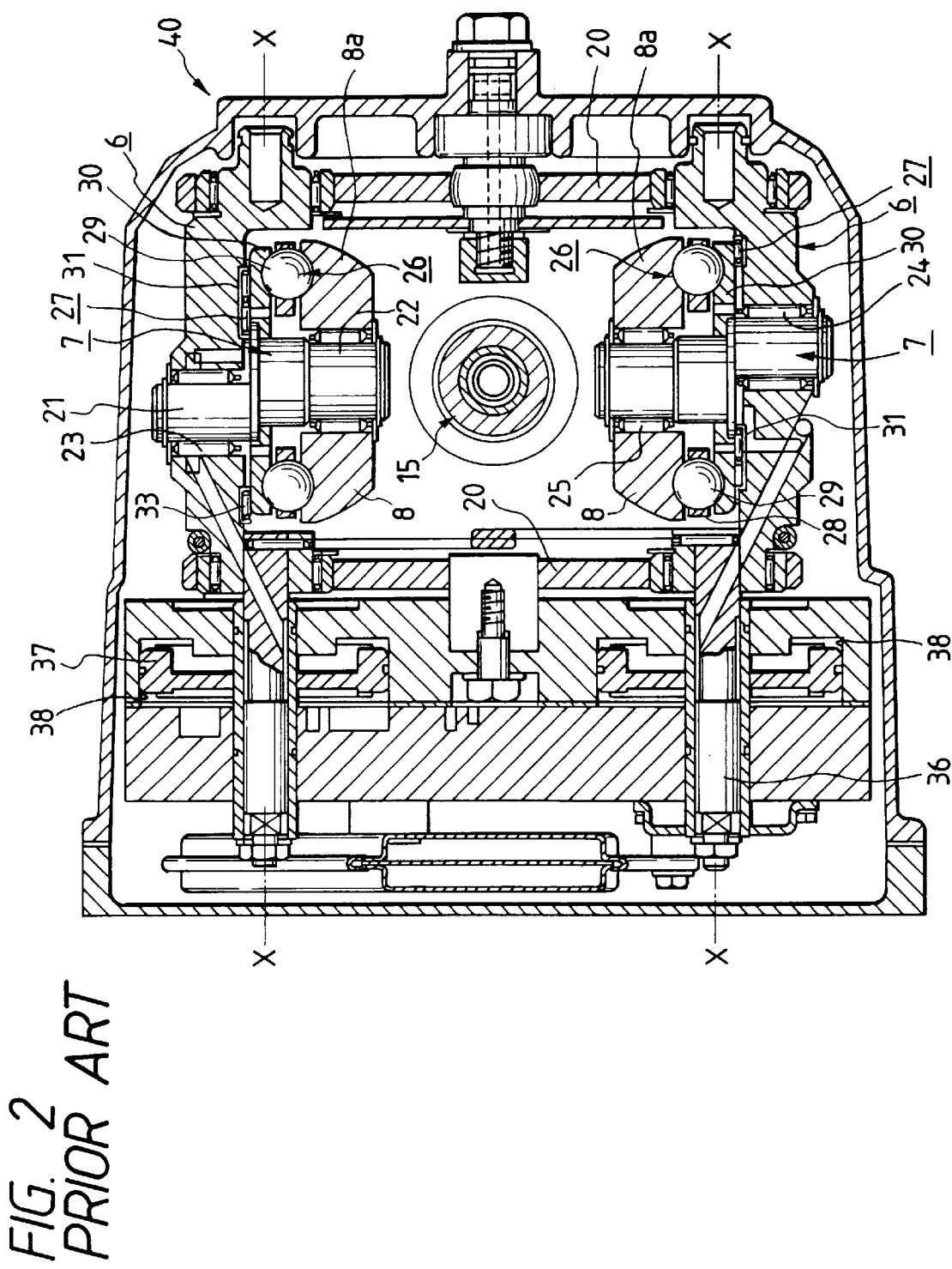
FIG. 2 is a cross-sectional view taken along the line II—II of FIG. 1.
Figure 3:
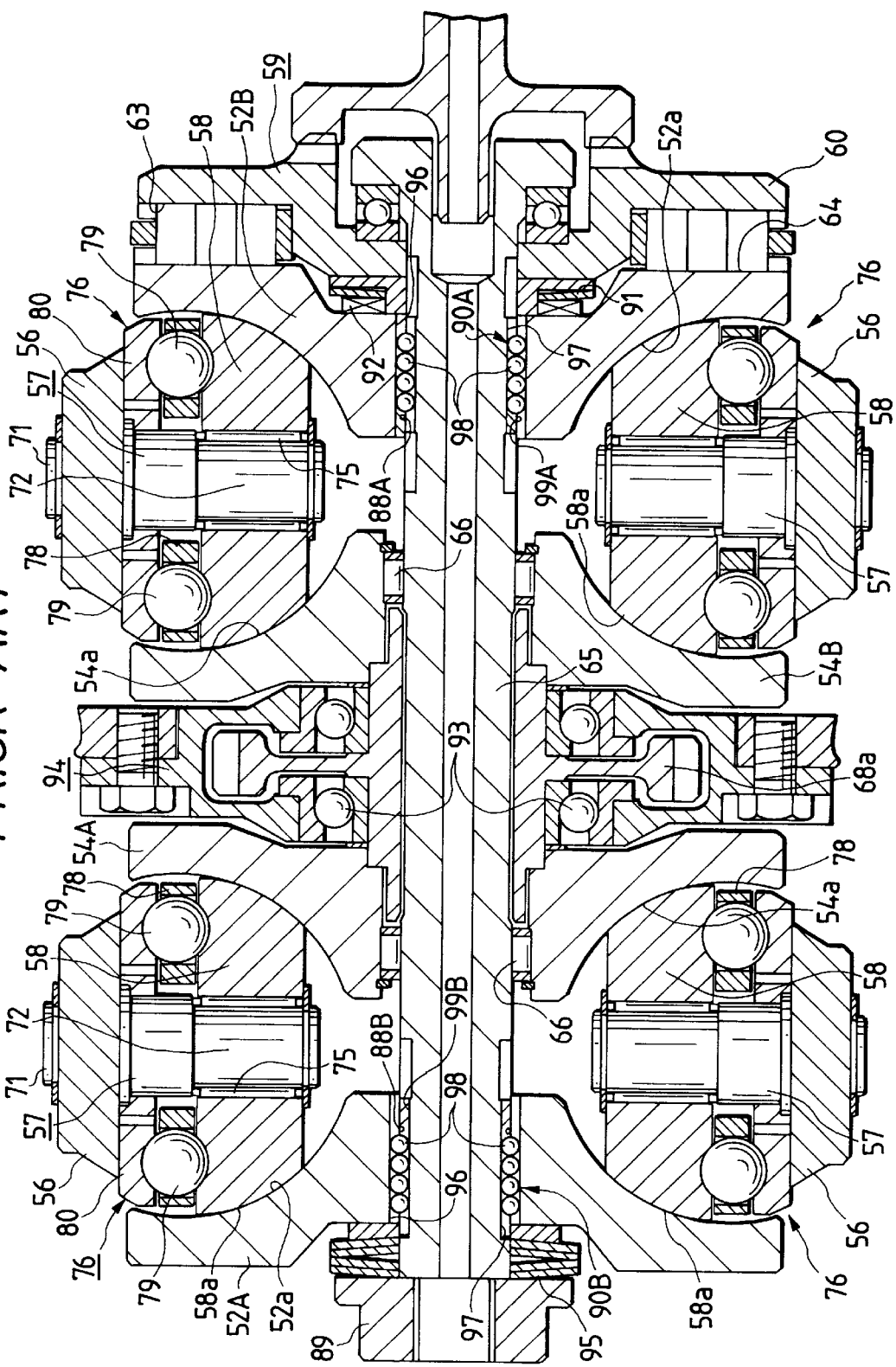
FIG. 3 is a fragmentary cross-sectional view showing a second example of a specific structure according to the prior art.
Figure 4:
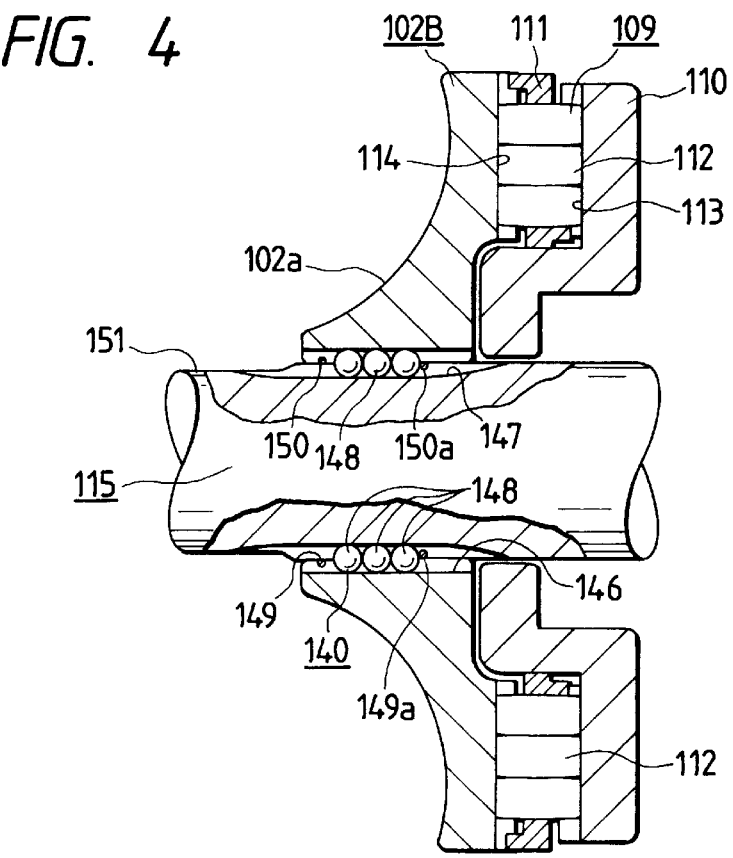
FIG. 4 is a cross-sectional view of principal portions showing an embodiment of the present invention in a state in which an input shaft and an input side disc have been combined together through a ball spline.
Figure 5:
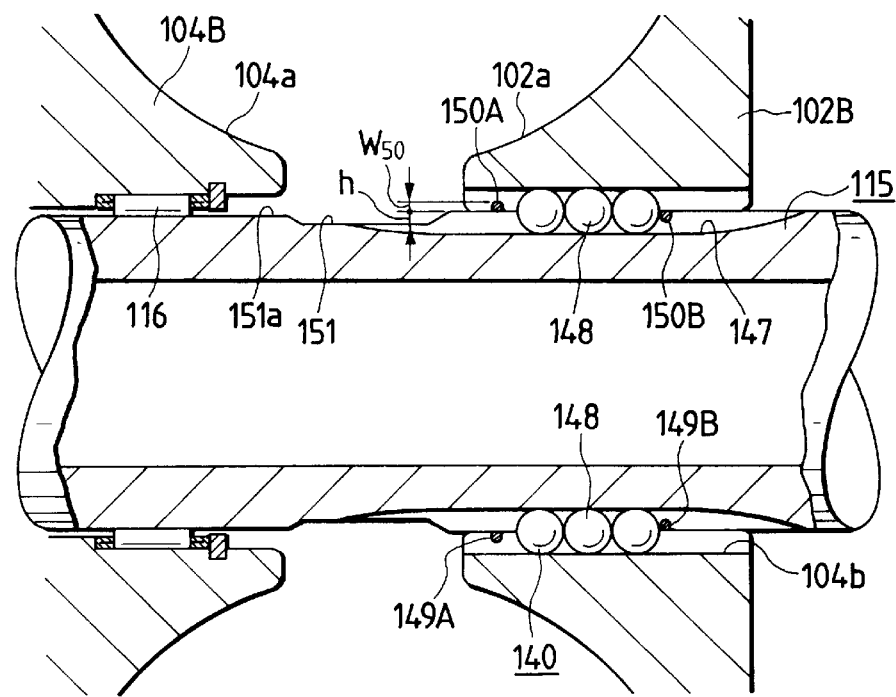
FIG. 5 is an enlarged cross-sectional view of the central portion of FIG. 4.

The trunnions 6, 56 and the power rollers 8, 58 (FIGS. 1 to 3) are mounted on predetermined portions after the plurality of balls 148 of the ball spline 140 in the above-described manner are inserted between the inner diameter side and outer diameter side ball spline grooves 146 and 147, and the restraining ring 150A is mounted on the inner peripheral surface of the input side disc 102B. It is desirable to do the above-described assembling work with the inner side 102a of the input side disc 102B turned upward because gravity acts in a direction to settle each constituent member.

The present embodiment is constructed and acts as described above, so that the work of assembling the input shaft and the input side disc through the ball spline becomes easy, and this embodiment makes the assembling work for the toroidal type continuously variable transmission efficient and can contribute to the reduced cost thereof.

Figure 12:
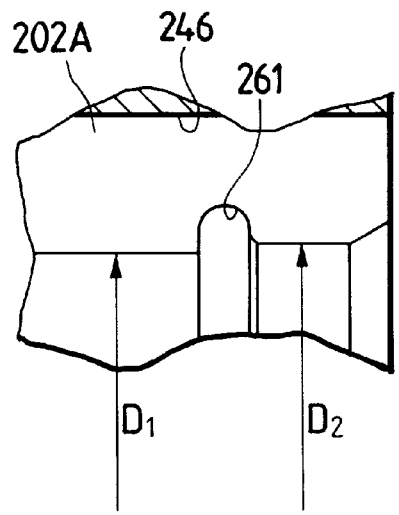
FIG. 12 is an enlarged view of the portion XII of FIG. 11 showing the input side disc as taken out.

FIGS. 11 and 12 show a second embodiment of the present invention. A principal feature of this embodiment is that an input side disc 202A and a pressing device 209 are assembled to the input shaft 215a of a toroidal type continuously variable transmission to thereby make these into a unit.

A flange portion 217a is secured to one end portion (the left end portion as viewed in FIG. 11) of the input shaft 215a, and an angular type inner race track 254 is formed on the inner side toward the intermediate portion thereof. Also, an angular type outer race track 255 is formed on the inner peripheral edge portion of a circular wheel-like cam plate 210 having its inner side made into a circumferentially uneven drive side cam surface 213. A plurality of balls 256 are provided for rolling between the outer race track 255 and the inner race track 254 to thereby constitute an angular type ball bearing 257, and the cam plate 210 is supported for rotation relation to the input shaft 215a.

The input side disc 202A is supported on the portion from the intermediate portion toward the left end portion of the input shaft 215a through a ball spline 240. Accordingly, this input side disc 202A is axially movable relative to the input shaft 215a, but is circumferentially rotated integrally (synchronously) therewith. In order to prevent the escape of balls 248 of the ball spline 240A, a disc side snap ring 258 is secured to a portion toward the inner end (the right end as viewed in FIG. 11) of an inner diameter side ball spline groove 246 axially formed in the inner peripheral surface of the input side disc 202A, and a shaft side snap ring 259 is secured to a portion toward the outer end (the left end as viewed in FIG. 11) of an outer diameter side ball spline groove 247 axially formed in the outer peripheral surface of the input shaft 215a. The balls 248 are prevented from slipping out of the ball spline grooves 246 and 247 by the respective snap rings 258 and 259. These snap rings 258 and 259 are provided with anti-rotation means engageable with the ball spline grooves 246 and 247 formed in the input side disc 202A and the input shaft 215a so that the snap rings 258 and 259 themselves may not rotate and the balls 248 may not slip out of these snap rings.

A small-diametered portion 260 is formed on the outer peripheral surface of the intermediate portion of the input shaft 215a and one (right) end portion of the outer diameter side ball spline groove 247 so that the work of mounting the disc side snap ring 258 can be done after the balls 248 have been inserted between the ball spline grooves 246 and 247. Also, as regards inner diameters $D_1$ and $D_2$ of the input side disc 202A, as shown in FIG. 12, the inner diameter $D_2$ of the portion toward the side opening in the inner side is made larger than the inner diameter $D_1$ of the portion toward the outer side (toward the left as viewed in FIG. 12) of a restraining groove 261 for restraining the disc side snap ring 258 ($D_1<D_2$). This is for enabling the work of mounting the disc side snap ring 258 to be done easily after the balls 248 have been mounted. There is also the effect of making the axial dimension of the inner diameter $D_1$ portion which need be dimensionally more accurately finished small and achieving the facilitation of the finishing work for the input side disc 202A. The outer side of the input side disc 202A opposed to the drive side cam surface 213 is made into a driven side cam surface 214 which is circumferentially uneven, and the axially opposite inner side 202a is made into a concave surface of an arcuate cross-sectional shape.

Also, a plurality of rollers 212 are held between the drive side cam surface 213 and the driven side cam surface 214 to thereby constitute a loading cam type pressing device 209. The rollers 212 are held for rolling by a holder 211 generally formed into the shape of a circular wheel. The rollers 212 diametrally back up the thinnest portion of the input side disc 202A (the bottom portion of the inner side 202a). Also, that portion of the cam plate 210 on which the outer race track 255 is formed enters into the recess of the input side disc 202A, and can secure the rigidity of the portion on which the outer race track 255 is formed, and can prevent the axial dimension of the portion in which the pressing device 209 and the input side disc 202A from being increased.

In the case of the input side disc unit for the toroidal type continuously variable transmission according to the present embodiment, before assembled to the continuously variable transmission, the input shaft 215a, the ball bearing 257, the cam plate 210, the input side disc 202A, the rollers 212 and the holder 211 which are discrete from one another are pre-assembled into the positional relation after the completion of the assembly. This assembling work is done in the following manner.

First, the shaft side snap ring 259 and another shaft side snap ring 259a for a ball spline supporting another input side disc, 52B (see FIG. 3) are mounted on the outer peripheral surface of the input shaft 215a. Then, with the input shaft 215a made upright with one end portion thereof turned downward, the cam plate 210 is mounted on this one end portion through the ball bearing 257. Next, the rollers 212 and the holder 211 are mounted on a drive side cam surface 213 provided on this cam plate 210. Subsequently, the input side disc 202A is fitted on the input shaft 215a, and then the inner diameter side and the outer diameter side ball spline grooves 246 and 247 are aligned with each other, and the balls 248 are inserted therebetween.

The cam plate 210 of the pressing device 209 is then rotated to thereby move the input side disc 202A axially on the input shaft 215a and make the inner diameter side opening of the restraining groove 261 open to the small-diametered portion 260. Then, through this small-diametered portion 260, the disc side snap ring 258 is fitted in the portion toward the inner side 202a of the inner peripheral surface of the input side disc 202A and is aligned with the restraining groove 261, and this disc side snap ring 258 itself is brought into engagement with the restraining groove 261 by its resilience. Thereafter, the cam plate 210 is rotated in the opposite direction (or further in the same direction) to thereby cause the rollers 212 to bear against the recesses of the drive side and driven side cam surfaces 213 and 214. Here, restraining groove 261 axially deviates from the small-diametered portion 260, and it never happens that the disc side snap ring 258 slips out of this restraining groove 261.

The disc side snap ring 258 prevents the balls 248 from slipping out from the inner diameter side ball spline groove 246 and the outer diameter side ball spline groove 247 toward the inner side 202a of the input side disc 202A.

When the parts 215a, 257, 210, 202A, 212 and 211 are assembled together in the manner described above, the dimension and operative state of each part are confirmed, and if these are proper, each part is tentatively secured by a suitable jig. On the other hand, if the above-mentioned dimension and operative state are improper, these members are disassembled and re-assembled with different parts.

Thus, according to the present embodiment, the deviation of the positional relation of each part based on the integration of the dimensional errors of the constituent parts and further, whether each constituent part functions correctly can be confirmed before these constituent parts are finally assembled in a housing. Accordingly, without requiring the cumbersome work of disassembling and re-assembling the entire toroidal type continuously variable transmission, the positional relations among the constituent parts can be maintained highly accurate, and the efficiency and durability of the continuously variable transmission can be secured. On the other hand, as regards also the output side disc unit and the power roller unit, before a plurality of parts are assembled in the housing after they have been assembled together, the dimension and operative state of each part are confirmed. If the dimension and operative state are proper, each part is tentatively secured a suitable jig. Accordingly, in a state in which the above-mentioned two units have been combined together in the housing and the toroidal type continuously variable transmission has been completed, the operative state of each constituent part can be made proper.

As a preservative oil made to adhere to the surface of each member of the two units, it is preferable to use a preservative oil which does not readily deteriorate the traction oil filling the interior of the toroidal type continuously variable transmission even when it is mixed with this traction oil.

Figure 13:
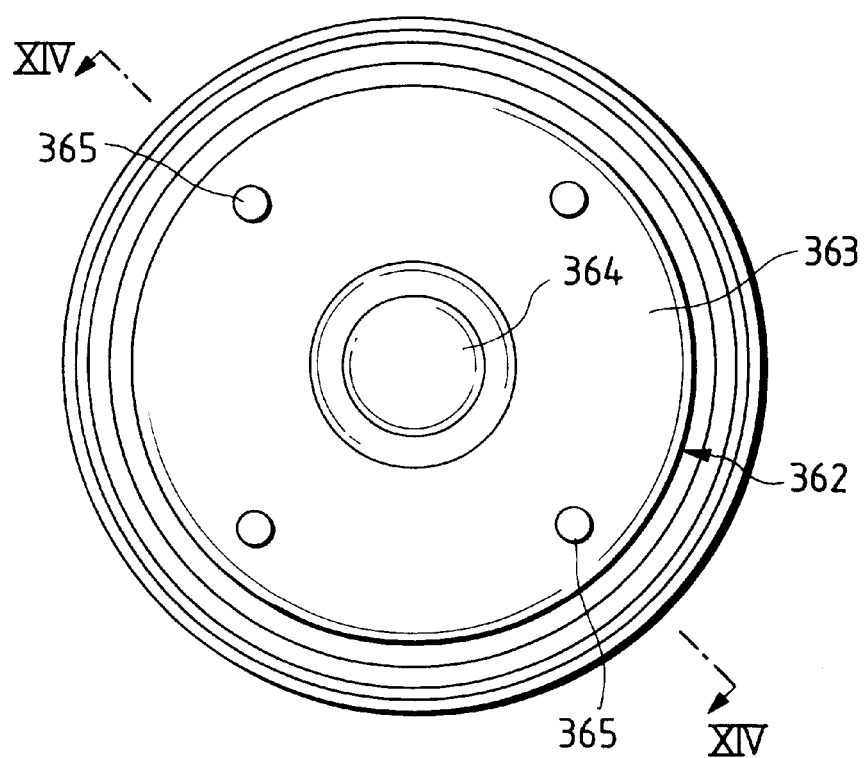
FIG. 13 is an end view showing a third embodiment of the present invention.
Figure 14:
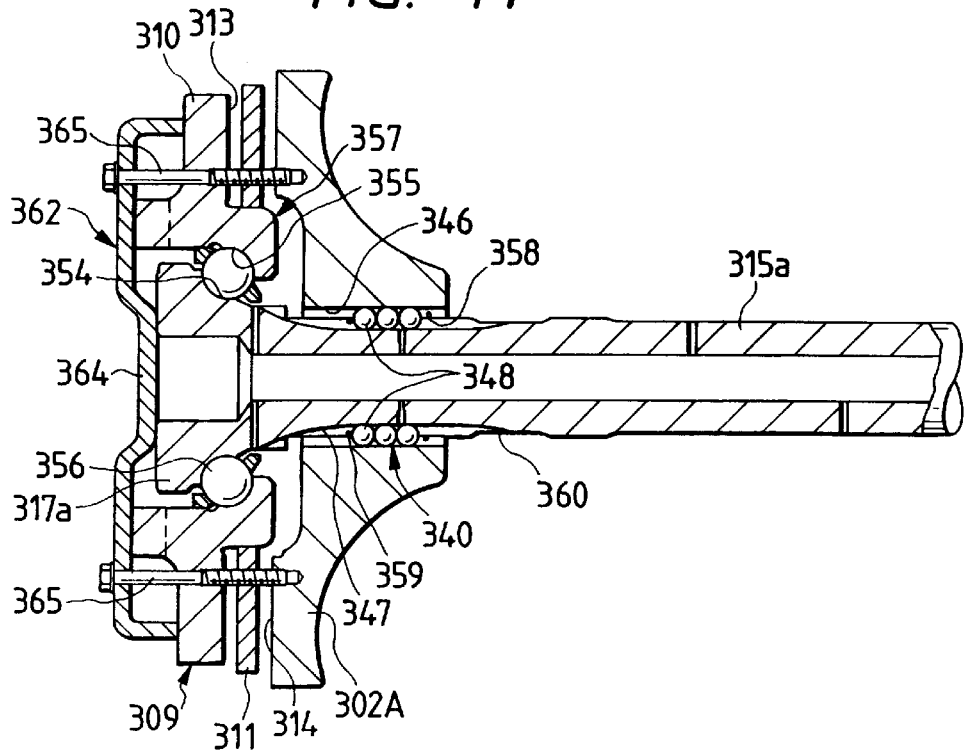
FIG. 14 is a cross-sectional view taken along the line XIV—XIV of FIG. 13.

FIGS. 13 and 14 show a third embodiment of the present invention. In this embodiment, a holding-down jig 362 is assembled to the structure of the above-described second embodiment so that during the conveying work for the input side disc unit, the parts 215a, 257, 210, 202A, 212 and 211 (FIG. 11) pre-combined together may not separate from one another. The holding-down jig 362 comprises a holding-down plate 363 manufactured by a press-worked metal plate.

The holding-down plate 363 is generally formed into a circular dish-like shape having a concave portion 364 at a central portion thereof, and is coupled to an input side disc 302A by a pair of bolts 365 extending through a cam plate 310 and a holder 311. Thereby, the input side disc 302A, the cam plate 310, the holder 311 and the pressing device rollers, as well as the pressing device rollers, are prevented from separating from one another in a state in which the phases of the input side disc 302A, the cam plate 310 and the holder 311 in the direction of rotation thereof are regulated.

The central concave portion 364 of the holding-down plate 363 bears against one end surface of the flange portion 317a. Accordingly, in this state, the parts 315a, 357, 310, 302A, 312 and 311 can be reliably prevented from separating from one another with the conveying work or the like.

When a slit is formed in the outer peripheral edge of the projected portion of one of the cam plate 310, and the input side disc 302A, in order to detect the number of revolutions of the input side of the toroidal type continuously variable transmission, this slit can be utilized for the regulation of the positions of the members 310, 302A and 311 in the direction of rotation thereof or as a catching portion for the holding-down jig 362.

Figure 15:
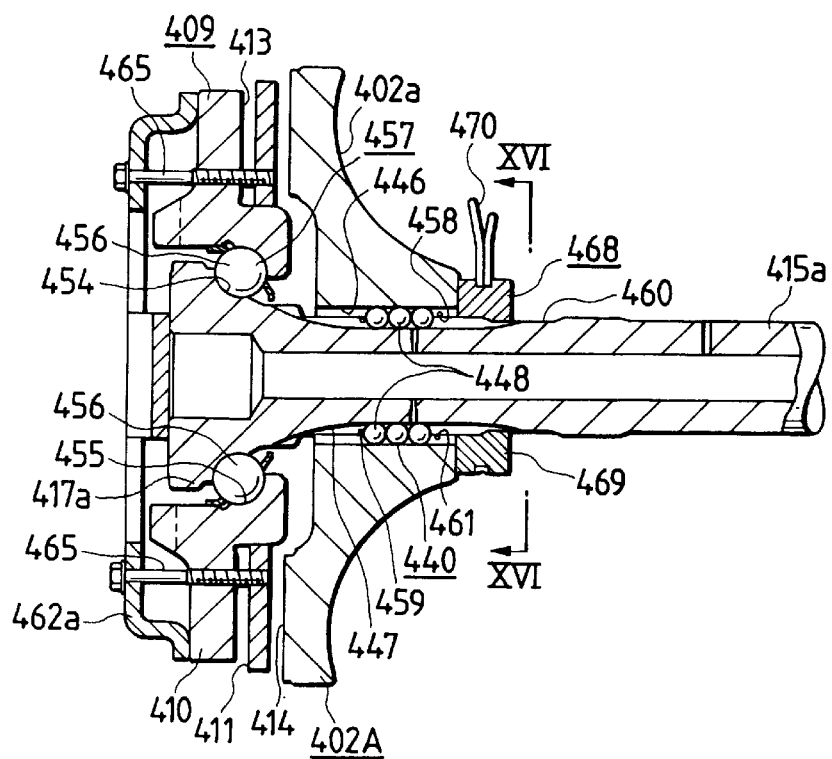
FIG. 15 is a cross-sectional view showing a fourth embodiment of the present invention.
Figure 16:
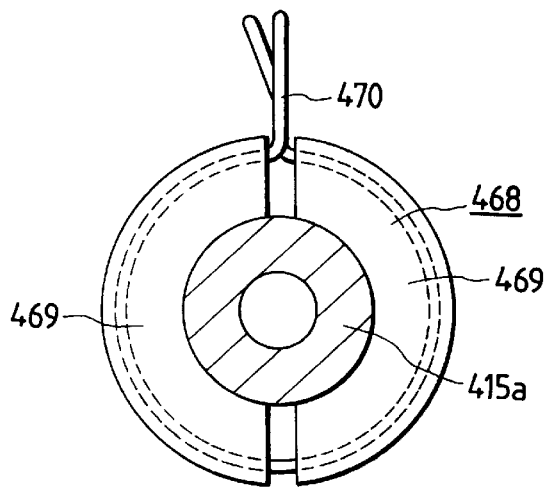
FIG. 16 is a partly omitted cross-sectional view taken along the line XVI—XVI of FIG. 15.
Figure 17:
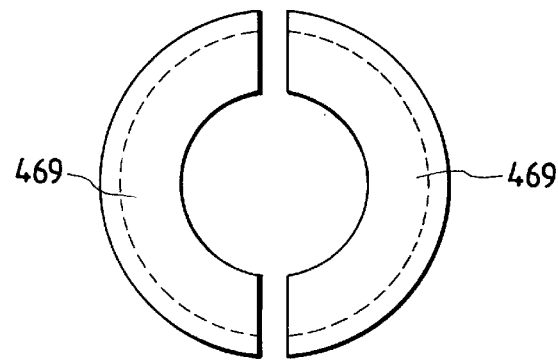
FIG. 17 is a front view of a pair of holding-down pieces as they are seen from the same direction as FIG. 16.

FIGS. 15 to 17 show a fourth embodiment of the present invention. This embodiment is such that the tip end portions of outer bolts 465 for a holding-down jig 462a are threadably engaged with a holder 411 to thereby prevent an input shaft 415a from slipping out of the inside of an input side disc 402A. If this is done, threaded holes for inserting the bolts 465 thereinto need not be formed in the input side disc 402A, and this is advantageous in securing the durability of the input side disc 402A which receives a great load during operation. However, if the input side disc is left as it is, the input shaft 415a will slip out of the inside of the input side disc 402A, so that a second holding-down jig 468 is assembled to the input side disc to thereby prevent this slipping-out.

The second holding-down jig 468 comprises a pair of holding-down pieces 469 each formed into a semicircular wheel-like shape, and a holding-down wire 470 for bundling them. In a state in which the jig 468 is fitted on the outer peripheral surface of the intermediate portion of the input shaft 415a, one side (the left side as viewed in FIG. 15) thereof is abutted against the inner end surface of the input side disc 402A to thereby prevent the slipping-out of the input shaft 415a. The second holding-down jig 468 is removed from the input shaft 415a in the course of the work of assembling the input side disc unit to the continuously variable transmission.

The holding-down jigs 362, 462a used in the aforedescribed third and fourth embodiments and the second holding-down jig 468 are made softer than the parts 315a (415a), 357 (457), 310 (410), 302A (402A) the pressing device rollers so as not to injure these parts. Accordingly, when making the holding-down jigs of a metallic material, they are made of a relatively soft metal such as a steel plate material press-worked but not quenched, copper or aluminum.

Further, when the amount of use of the jigs 362, 462a is great, they can also be made by injection-molding synthetic resin such as polyamide 66 or rubber such as nitrile rubber. Also, the holding-down jigs 362, 462a and the second holding-down jig 468 may be made disposable, but during mass production, they can be made reusable to thereby achieve a reduction in the cost of the toroidal type continuously variable transmission as well as the saving of resources.

Figure 18:
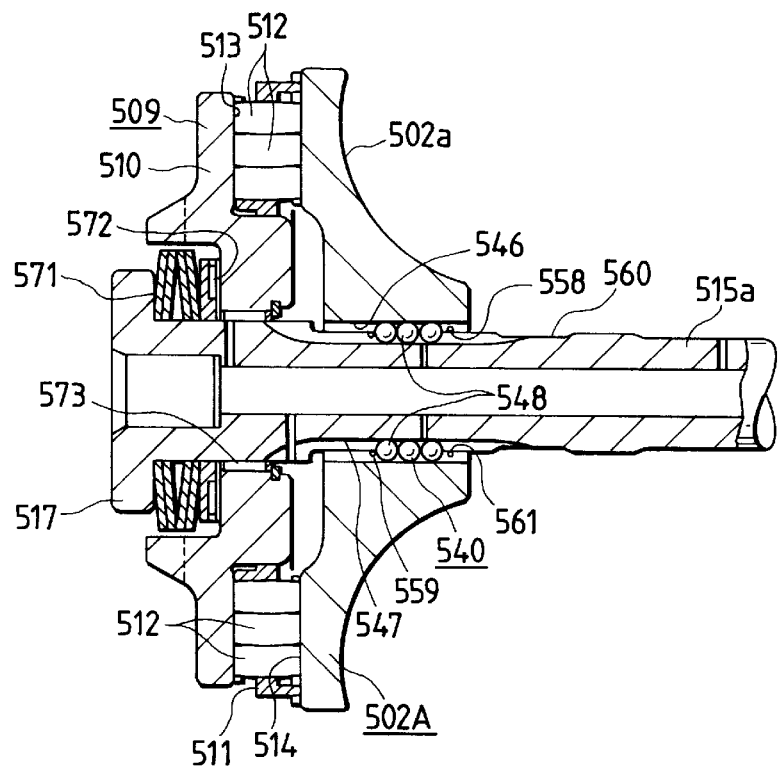
FIG. 18 is a cross-sectional view showing a fifth embodiment of the present invention.

FIG. 18 shows a fifth embodiment of the present invention. In the case of this embodiment, a belleville spring 571 for imparting a pre-load is provided between a flange portion 517 formed on one end portion of an input shaft 515a and a cam plate 510. A thrust needle bearing 572 and a radial needle bearing 573 are provided between the belleville spring 571 and the cam plate 510, and between the inner peripheral surface of this cam plate 510 and the outer peripheral surface of the input shaft 515a, respectively. Like the aforedescribed second to fourth embodiments, the present invention can also be embodied in such structure.

The embodiments of FIGS. 11 to 18 can also be applied to a toroidal type continuously variable transmission of the double cavity type described previously.

According to the input side disc unit for the toroidal type continuously variable transmission of the present embodiment, a reduction in the cost of the toroidal type continuously variable transmission can be achieved by making the assembling work for the toroidal type continuously variable transmission efficient.

What is claimed is:

1. A continuously variable transmission, comprising a rotary shaft, a first disc supported around an intermediate portion of said rotary shaft for axial movement relative thereto but against rotation relative to said rotary shaft, a second disc supported for rotation relative to said rotary shaft with an inner side thereof opposed to an inner side of said first disc, a trunnion rockable about a pivot axis transverse to said rotary shaft, a power roller mounted to said trunnion and held between the inner sides of said first and second discs, and a loading-cam pressing device operative to rotatively drive said first disc while pressing said first disc toward said second disc, characterized in that a ball spline is formed between an inner peripheral surface of said first disc and an outer peripheral surface of the intermediate portion of said rotary shaft, a restraining device limiting displacement of balls of said ball spline is provided toward an inner axial end of said first disc and include a restraining member mounted to the inner peripheral surface of said first disc, a small-diametered portion is formed on an outer peripheral surface of the intermediate portion of said rotary shaft between said first and second discs, and said small-diametered portion and said first are arranged such that said restraining member is mountable to the inner peripheral surface of said first disc by insertion bet ween said small-diametered portion and said inner peripheral surface of said first disc, with a mounting position of said restraining member and said small-diametered portion aligned with each other along an axis of said rotary shaft.

2. The continuously variable transmission of claim 1, wherein said ball spline comprises a first ball spline groove formed in the inner peripheral surface of said first disc, a second ball spline groove formed in the outer peripheral surface of said rotary shaft and opposed to said first ball spline groove, and a plurality of balls interposed between said two grooves.

3. The continuously variable transmission of claim 1, wherein said restraining device comprises an annular groove formed on the inner peripheral surface of said first disc, and said restraining member is a restraining ring retained in said groove to interfere with said balls.

4. A pre-assembled input side disc unit for use in assembling a continuously variable transmission, comprising an input shaft having a flange portion on one axial end portion thereof, a cam plate supported on an inner side of said flange portion and having an inner side formed as a drive side cam surface, an input side disc having an outer side opposed to said drive side cam surface formed as a driven side cam surface and having an axially opposite inner side formed as a concave surface having an arcuate cross-sectional shape, said input side disc being supported toward one end of said input shaft for axial displacement relative to said input shaft but against rotation relative to said input shaft, a plurality of rollers held between said drive side cam surface and said driven side cam surface, and a holder holding said plurality of rollers for rolling, characterized in that said input side disc is supported around said input shaft through a ball spline having a plurality of balls inserted between a first ball spline groove formed in an inner peripheral surface of said input side disc and a second ball spline groove formed in an outer peripheral surface of said input shaft, a restraining device limiting displacement of balls of said ball spline is provided toward an inner axial end of said first disc and includes a restraining member mounted to the inner peripheral surface of said first disc, a small-diametered portion is formed on an outer peripheral surface of the intermediate portion of said input shaft between said first and second discs, and said small-diametered a portion and said first disc are arranged such that said restraining member is mountabled to the inner peripheral surface of said first disc by insertion between said small-diametered portion and said inner peripheral surface of said first disc, with a mounting position of said restraining member and said small-diametered portion aligned with each other along an axis of said input shaft.

5. An input side disc unit for a continuously variable transmission according to claim 4, wherein said restraining device comprises an annular groove formed on the inner peripheral surface of said first disc, and said restraining member is a restraining ring retained in said groove to interfere with said balls.

6. An input side disc unit for a continuously variable transmission according to claim 5, wherein an inner diameter of said input side disc is greater at a portion between the inner end of said first disc and said retaining groove than at a portion between an outer axial end of said disc and said retaining groove.

7. An input side disc unit for a continuously variable transmission according to any one of claims 4 to 6, in combination with a holding-down jig arrangement non-separably holding the input shaft, the cam plate, the input side disc, the rollers and the holder together.

8. The combination of claim 7, wherein said holding-down jig arrangement includes a bolt extending through said cam plate and said holder and having a tip end coupled to said input side disc to regulate rotational phases of said cam plate, said input side disc and said holder.

9. The combination of claim 8, wherein a portion of said holding-down jig arrangement holds an end surface of said input shaft to thereby prevent said input shaft from slipping out from inside of said cam plate.

10. The combination of claim 9, wherein portions of said holding-down jig arrangement are of softer material than metallic material of said input shaft, said cam plate, said input side disc and said rollers.

11. The combination of claim 8, wherein portions of said holding-down jig arrangement are of softer material than metallic material of said input shaft, said cam plate, said input side disc and said rollers.

12. The combination of claim 7, wherein portions of said holding-down jig arrangement are of softer material than metallic material of said input shaft, said cam plate, said input side disc and said rollers.

13. The combination of claim 7, wherein said holding-down jig arrangement includes a threaded hole formed in the holder, and a threaded member extending through the cam disc and in threaded engagement with said hole of holder.

14. The combination of claim 13, wherein portions of said holding-down jig arrangement are of softer material than metallic material of said input shaft, said cam plate, said input side disc and said rollers.

15. The combination of claim 7, wherein said holding-down jig arrangement comprises a first holding-down jig coupling said cam plate and said holder together to regulate rotational phases thereof, and a second holding-down jig fitted and supported on the intermediate portion of said input shaft so as to prevent said input side disc from moving away from said cam plate.

16. The combination of claim 15, wherein portions of said holding-down jig arrangement are of softer material than metallic material of said input shaft, said cam plate, said input side disc and said rollers.

* * * * *